US008352453B2

(12) United States Patent  
Chatterjee (10) Patent No.: US 8,352,453 B2  
(45) Date of Patent: Jan. 8, 2013

(54) PLAN-BASED COMPLIANCE SCORE COMPUTATION FOR COMPOSITE TARGETS/SYSTEMS

(75) Inventor: Raja Chatterjee, Nashua, NH (US)

(73) Assignee: Oracle International Corporation, Redwood Shores, CA (US)

(*) Notice: Subject to any disclaimer, the term of this patent is extended or adjusted under 35 U.S.C. 154(b) by 140 days.

(21) Appl. No.: 12/821,073

(22) Filed: Jun. 22, 2010

(65) Prior Publication Data

US 2011/0313978 A1     Dec. 22, 2011

(51) Int. Cl.  
*G06F 7/00* (2006.01)
(52) U.S. Cl. ....................................... 707/707
(58) Field of Classification Search .......... 707/707, 707/748, 758  
See application file for complete search history.

(56) References Cited

U.S. PATENT DOCUMENTS

| | | | |
|---|---|---|---|
| 7,113,914 | B1 | 9/2006 | Spirlmann et al. |
| 2005/0066021 | A1 | 3/2005 | Megley |
| 2005/0071185 | A1 | 3/2005 | Thompson |
| 2006/0282276 | A1 | 12/2006 | Venzon et al. |
| 2007/0250621 | A1 | 10/2007 | Hillier |
| 2007/0288389 | A1 | 12/2007 | Vaughan et al. |
| 2008/0015913 | A1 | 1/2008 | Courtney et al. |
| 2008/0134176 | A1* | 6/2008 | Fitzgerald et al. ............... 718/1 |
| 2008/0270207 | A1 | 10/2008 | Santos et al. |
| 2008/0312988 | A1 | 12/2008 | Trapp et al. |

OTHER PUBLICATIONS

"PCI Compliance—A Simple Approach with Security Expressions", Symanted.com, dated May 2007, 8 pages.  
Symantec, "Sarbanes-Oxley Compliance Reports Security and Audit Directors Live For", White Pater: Enterprise Security Management, Dated 2006, 9 pages.

* cited by examiner

*Primary Examiner* — Truong Vo  
(74) *Attorney, Agent, or Firm* — Hickman Palermo Truong Becker Bingham Wong LLP

(57) ABSTRACT

A method and apparatus for plan-based compliance score computation is provided. Compliance-specific target results are stored. The compliance results include, for each target, a subset of target-specific compliance results for a rule subset of compliance rules. Each target-specific compliance result of the result subset includes a compliance value. The compliance value represents compliance to a compliance rule of the rule subset. An execution plan is generated. The execution plan generates data that measures compliance to a first compliance standard. For each target-specific compliance result, an execution plan step is generated for computing the compliance value of the respective compliance rule of the respective target.

18 Claims, 8 Drawing Sheets

Top-Down Plan Insertion Sequence for Compliance Standard 510:
Compliance Standard 510 Score = Weighted Score of (Rule Folder 520, Rule Folder 522), Step ID = 1
Rule Folder 522 Score = Weighted Score of (Rule 534, Rule 536), Step ID = 11
Rule Folder 520 Score = Weighted Score of (Rule 530, Rule 532), Step ID = 12

Bottom-Up Plan Execution Sequence for Compliance Standard 510:
Rule Folder 520 Score = Weighted Score of (Rule 530, Rule 532), Step ID = 12
Rule Folder 522 Score = Weighted Score of (Rule 534, Rule 536), Step ID = 11
Compliance Standard 510 Score = Weighted Score of (Rule Folder 520, Rule Folder 522), Step ID = 1

PLAN-BASED COMPLIANCE SCORE COMPUTATION FOR COMPOSITE TARGETS/SYSTEMS

FIELD OF THE INVENTION

The present invention relates to measurement of compliance standards.

BACKGROUND

Enterprise management tools are used to manage data centers, and may provide a wide variety of administrative tools and functionality. For example, Oracle Enterprise Manager combines Oracle's system management console, common services, and integrated platform graphical tools. It provides an integrated set of administration applications to help automate and simplify administrator tasks. These supplemental applications focus on specific areas of administration, helping administrators with their daily and routine tasks of keeping services operational.

Management tools have, in the past, enabled administrators to track the state of individual "targets" such as services, hardware, and applications using alerts and other such mechanisms. However, alarms that merely indicate the state of a particular target may not provide enough information about the overall health of a data center or a particular portion of a data center, such as a composite target, which may include a set of member targets working together to act as a system or provide a common service. In addition, compliance standards now define requirements that go beyond individual targets.

As more compliance standards become required, these compliance standards tend to overlap with one another, imposing different requirements on the same data center. In some cases, the same target or member target may have multiple requirements imposed on it by a variety of compliance standards. To further complicate matters, the importance of a particular compliance standard rule to one compliance standard may be different than the importance of the same rule to a different compliance standard. Thus, the traditional mechanisms for managing state information associated with targets in a data center are not well-suited to manage emerging compliance standards, such as those that require a determination as to whether a composite target is in compliance with a particular compliance standard.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Compliance with one or more compliance standards is measured. In an embodiment, compliance-specific target results are stored. The compliance results include, for each target, a subset of target-specific compliance results for a rule subset of compliance rules. Each target-specific compliance result of the result subset includes a compliance value. The compliance value represents compliance to a compliance rule of the rule subset. An execution plan is generated. The execution plan generates data that measures compliance to a first compliance standard. For each target-specific compliance result, an execution plan step is generated for computing the compliance value of the respective compliance rule of the respective target.

In an embodiment, one of the targets is a composite target that includes one or more member targets. In an embodiment, the first compliance standard is associated with a first compliance rule and a second compliance standard is associated with a second compliance rule. The contribution of the first rule to the first compliance standard is different than the contribution of the second rule to the second compliance standard. In an embodiment, the first rule is associated with the first composite target, which has, as a member, the first member target. The second rule is associated with a second composite target, which also has as a member the first member target.

Terminology and Functional Overview

Composite Target

A composite target can contain one or more member targets of different target types. For example, a Siebel application can be a composite target (or system), and it may contain member targets, such as Oracle Database Server, Oracle WebLogic Server, or other computer resources. A composite target hierarchy can be of variable depth and span. A composite target is a logical target made up of physical targets which are monitored by agents. Physical targets may include any hardware element, software service, or any other computer resource, such as a web server or database server instance. Agents collect configuration data for the physical targets, and may even reside on the target. The configuration state of a composite target is made up of the combined configuration state of the physical targets. In addition, the composite target may include additional associated logic or metadata that stores preferences and weight contribution data.

Compliance Standard

A Compliance Standard is a representation of a compliance control to be tested against a set of information technology (IT) infrastructure to determine if the control is being followed. A compliance control for COBIT (Control Objectives for Information and related Technology) or any other industry framework is a description of the "test" that an IT organization performs to ensure that policies, processes, and procedures are being followed in conformance with a standard. A compliance standard may include other compliance standards, called included compliance standards.

The compliance standard may contain rules, rule groups or "rule folders" that include or refer to the actual tests that will occur to "score" the compliance of the test. Two compliance standards may even use the same rule R. But a first CS may require that, for R, x=60 and a second CS may require that, for R, the value of x must be greater than 90 (where x is a parameter of the rule R). For example, one standard may require that passwords are changed every 90 days (password_expiry>:x, x being customized as 90), while another standard requires a change every 60 days password_expiry>:x, x being customized as 60). The rule parameter value will be different for each of these rules (in context of first CS and second CS) if the password is changed every 60 days, since this represents 100% rule compliance for one CS, but only 0% compliance for the other. Thus, rules may be customized to match multiple compliance standard requirements.

As mentioned earlier, compliance standard is associated with a particular target type and is assigned to one or more targets of that target type. The target type of an included standard may be the same target type of the parent standard, or of a target type of a member target (the member belongs to the parent target type). A compliance standard may also be assigned to a composite target containing targets of different member target types. A composite target has its own type, which may be independent from the type of its member targets.

Included Compliance Standard

A compliance standard that is included within another compliance standard is called an included compliance standard. The inclusion may semantically refer to the structure in an embodiment. In such an embodiment, any structural evolution of the included structure that is referred to will be reflected by the standard that is referring to it. A single included standard may be referred to by multiple compliance standards, and a parent compliance standard may include many other included compliance standards.

For example, a compliance standard associated with Oracle's Siebel customer relationship management (CRM) system may refer to an Oracle database management system (DBMS) compliance standard and a WebLogic compliance standard. The target types, which are included in the overall Seibel customer relationship management system, are specific target types that may be included in the parent target type.

Compliance Standard Rules

Compliance standard rules define tests that determine if a particular event or state associated with a target, such as a configuration data change event or configuration data state, affects compliance. Rules may be monitored in real time by agents and other state-checking mechanisms. A repository-check based rule may be used for checking the configuration state of one or multiple targets.

A rule is said to be compliant if it is determined that the configuration item(s) meet the desired state; that is, the rule test failed to identify any violations. Otherwise, a rule is said to be non-compliant if it has one or more violations. For example, a particular rule may require that no ports above port 30000 be open on a particular server. For each port on that server over port 30000 that is open, a violation will be triggered, and the rule will be said to be non-compliant. As another example, A CS may include rules that have policy logic that states, for example, that passwords must be changed every 90 days (first rule) and a particular type of encryption must be used (second rule). If a rule evaluation generates a violation, then the user can specify a corrective action to automatically fix the violation, upon occurrence of the violation.

Real-time monitoring rules can be used to monitor file, process, operating system users, database tables, views, indexes, users, registry keys, active directory groups, or any other computer resource. These rules contain configuration parameters specifying what entities they will be monitoring. For example, the configuration may specify what files to monitor, how to monitor, what types of operations to monitor, when to perform monitoring functions, and even who to monitor. A compliance standard rule may be associated with individual targets as well as composite targets.

Rules may have an importance level attribute that denotes the importance of the rule, which is considered when determining compliance score. The rule may also have a severity level. For example, if the severity level is "critical" a rule violation may be considered a serious problem. Other tiers of severity may also be defined through a rule customization interface.

Rules may describe how to associate a target observation with a rule folder structure so that a compliance score may be built for each level of the rule folder. Rule compliance scores are rolled up to compute the compliance standard score. The compliance standard score may then be rolled up and reported along with other compliance standard scores.

Compliance Evaluation

Compliance evaluation is the process of testing all rules of a compliance standard against a target. Evaluation may be performed on target data information. An evaluation may result in one or more violations, and a compliance score will be generated for a compliance standard-target combination, which will represent a target's compliance with a certain standard. Each target is evaluated for compliance for each compliance standard inclusion context. For example, if a compliance standard is used twice, with each inclusion context giving a different weight to the compliance standard using a custom profile associated with the inclusion context, the target will be evaluated twice; once for each inclusion context.

The compliance evaluation solution evaluates configuration checks on target configuration data that is collected, and determines whether the configuration data associated with the target is in violation with respect to the desired configuration state. The degree of compliance of a target with respect to a standard may be measured by computing a compliance score. Compliance standards may be associated with different targets of the same type as the compliance standard. When a target or a member target associated with the compliance standard changes, the compliance standard processor re-computes the associated compliance standard compliance scores for the updated composite target. In an embodiment, when a standard is associated with a group, and a new member is added to the composite target, that member may be automatically associated with the standard. Leaf-level scores are rolled up to compute an overall score for a compliance standard, composite target, rule folder, or other intermediate or parent nodes in the hierarchy.

Structural Overview

Figure 1:
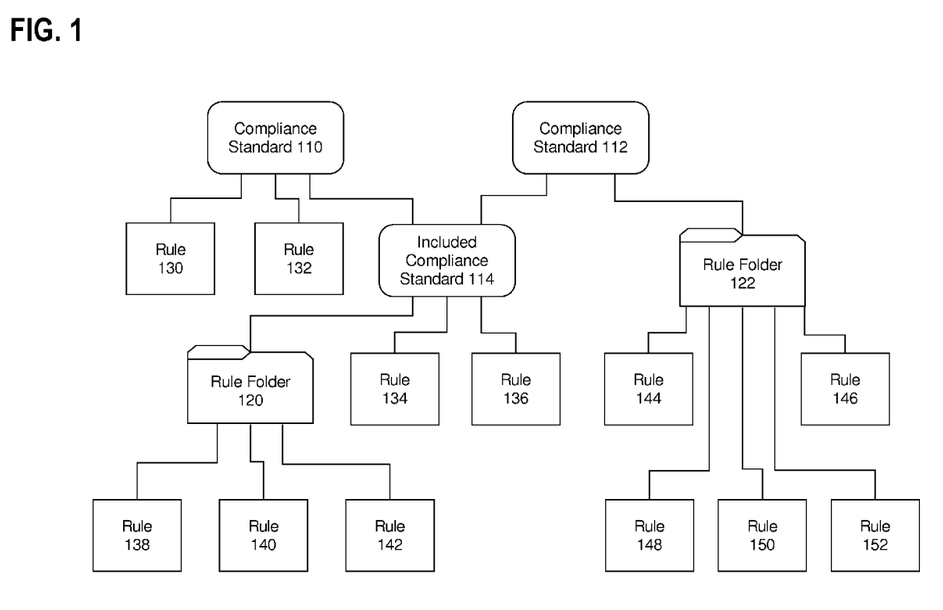
FIG. 1 illustrates a logical block diagram of a hierarchical compliance standard structure in an embodiment.

FIG. 1 illustrates a logical block diagram of a hierarchical compliance standard structure in an embodiment. Multiple compliance standards may be applied to a data center or other computing environment in an embodiment. Compliance standards may include rule folders, other compliance standards known as included compliance standards, and other types of intermediate nodes. These intermediate nodes may include other intermediate nodes, or rules as ultimate leaf nodes. Inclusion may be by reference or by data structure. For example, a compliance standard may have a reference to another compliance standard, rather than creating a copy of the rules in that compliance standard. This allows flexibility in compliance standard inclusion, and encourages reuse of compliance standards in a way that is more manageable.

Leaf nodes in a compliance standard hierarchy such as the one shown in FIG. 1, are rules. Compliance standard (CS) 110 includes rule 131, rule 132, and included compliance standard (ICS) 114. ICS 114 is also included by CS 112. ICS 114 may be reused in an embodiment as a CS. In other words, a CS becomes an ICS only by virtue of its inclusion in another CS or intermediate node.

ICS 114 includes rule 134, rule 136, and rule folder 120. In an embodiment, rule folders provide a logical structure to organize a set of rules. Rule folders may be configured to have a particular contribution to a compliance standard. The contribution may be based on the importance of the rules "within" the rule folder. Rule folder 120 includes rule 138, rule 140, and rule 142. Rule folder 122 includes rules 144-152.

Figure 2:
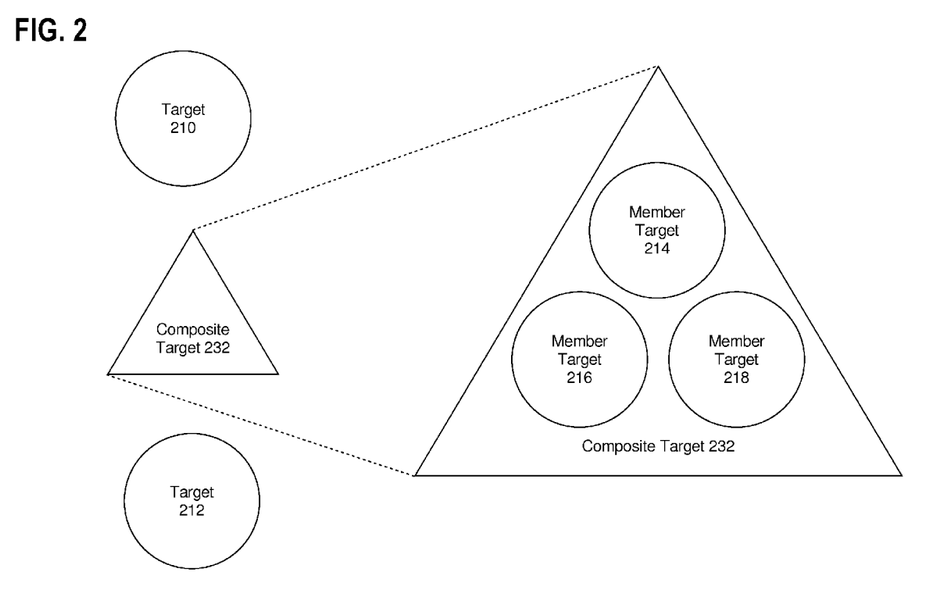
FIG. 2 illustrates a logical block diagram of a composite target in an embodiment.

FIG. 2 illustrates a logical block diagram of a composite target 232 in an embodiment. In addition, targets 210 and 210 are shown in FIG. 2. Composite target 232 includes three member targets: member targets 214-216. Composite targets may include any number of member targets. For example, a database management system may include hundreds of shared resources, each being a member target of the composite target, which is the database management system. However, a database management system may also be defined as an individual target, and not a composite target, for purposes of administration if desired.

Figure 3:
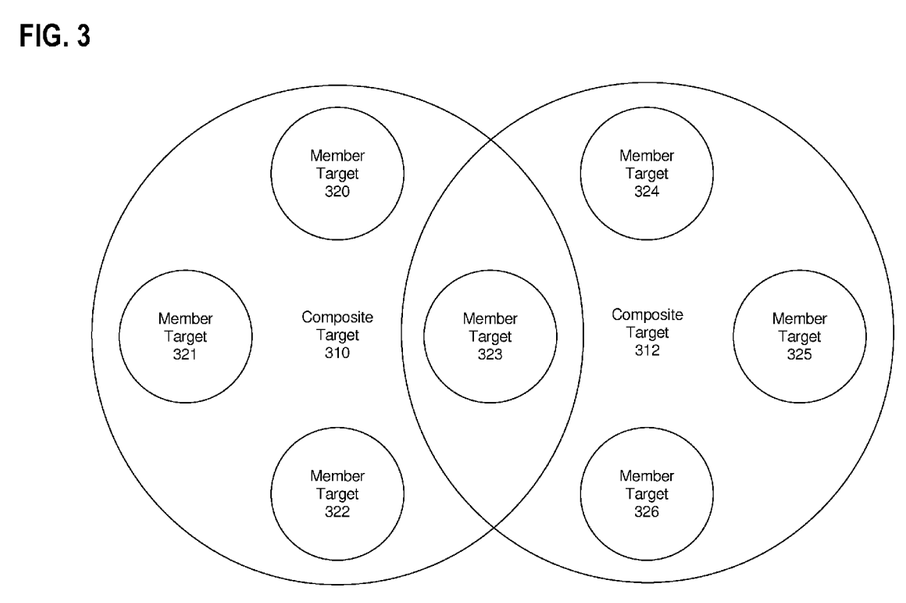
FIG. 3 illustrates a logical block diagram of overlapping composite targets in an embodiment.

FIG. 3 illustrates a logical block diagram of overlapping composite targets in an embodiment. Composite target 310 includes member targets 320-323. Composite target includes member targets 323-326. Each composite target has, as a member, member target 323. Each member target 320-326 may be of a different target type, and composite target 310 may have a type that is different from the type of composite target 312. This illustrates the possibility of multiple composite targets having overlapping members, even if the composite targets are of a different type from one another.

Likewise, different compliance standards may be assigned to composite targets 310 and 312. However, each of these compliance standards may include the same rule, even though the contribution of the shared rule may change from one compliance standard to the next. In addition, an ICS may be shared between compliance standards associated with composite targets 310 and 312. This is because the ICS will be associated with the target type associated with member target 323.

Figure 4:
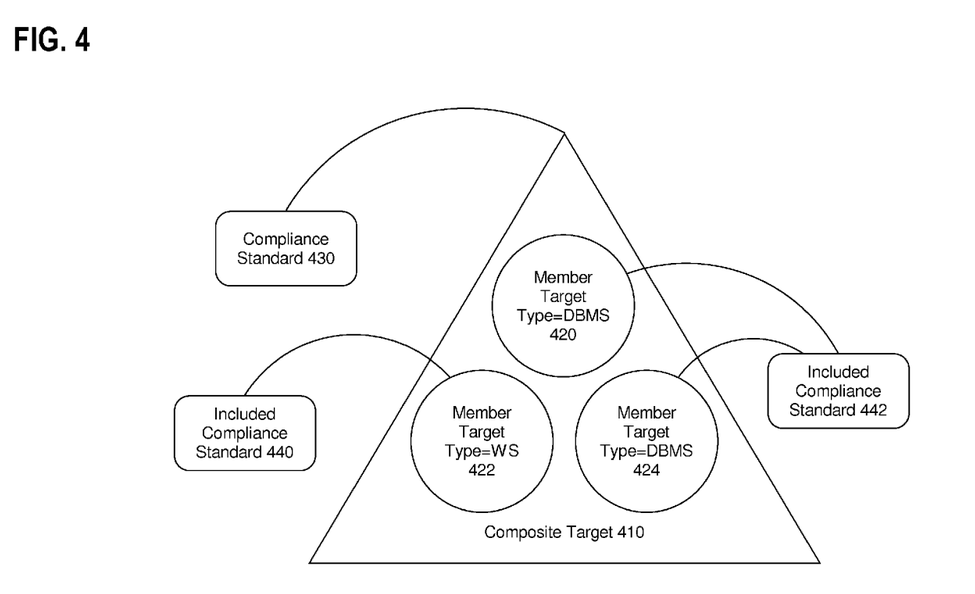
FIG. 4 illustrates a logical block diagram of compliance standard-type associations in an embodiment.

FIG. 4 illustrates a logical block diagram of compliance standard-type associations in an embodiment. Compliance standard 430 is associated with composite target 410. Composite target 410 has associated with it a particular target type, such as Seibel CRM. Member targets 420 and 424 are of type Database Management System (DBMS), and member target 422 is of type WebLogic Server (WS). Although each compliance standard is associated with a type, rules within the compliance standards associated with composite targets may evaluate member targets that are of an included type. However, included compliance standards may be used to manage compliance with member targets if such compliance standards are available. The parent compliance standard, such as compliance standard 430, refers to each ICS such as ICS 440 and ICS 442, and determines a score based on a weighted contribution of the scores provided by the included compliance standards.

Although execution plan metadata that defines the structure, preferences, and customization profiles for the compliance standards, rule folders, rules, other intermediate nodes, targets (including composite targets and member targets) need not be stored in any particular manner, this metadata may be stored in a database. Compliance score information may also be stored in a database.

In addition, different versions of execution plan metadata may be generated at runtime, and the runtime versions may be stored in a database. For example, if multiple compliance standards refer to the same particular included compliance standard, that particular compliance standard need only be stored once before runtime. However, multiple instances of the particular ICS (one for each inclusion) may be generated at runtime. Each runtime version of the particular ICS will have its own context and customization profile, which may define instance-specific attributes, such as the contribution of the ICS to its parent.

Keeping each runtime version of the compliance standards separate from the source version of the compliance standard allows for efficient management of the compliance standard. The source CS may be changed to reflect new standards requirements as the requirements evolve, and the runtime versions may be automatically generated based on the source each time a change is implemented.

Compliance Standard Execution Plan

Since data centers may include many targets that require a complicated compliance standard hierarchy, determining the compliance status of each compliance standard on a regular basis can be a costly operation without a compliance standard execution plan. A compliance standard execution plan may be used to determine the particular manner in which compliance results such as compliance standard scores are generated. In an embodiment, a separate execution plan is generated for each compliance standard. In another embodiment, a separate execution plan is generated for each instance of each compliance standard. For example, if an ICS is referred to by multiple parents, a separate execution plan may be generated for each inclusion context. In an embodiment, a roll up execution plan sequence is generated for each top level CS. For example, if an ICS is included in top level CS X and top level CS Y, the ICS will be part of the rollup plan for top level CS X and the rollup plan for top level CS Y.

In an embodiment, the change in state or configuration, or any other change in a target detected by an agent may trigger leaf level rule evaluation and the execution of a roll up execution plan. In another embodiment, snapshots of target state information may be uploaded to a compliance evaluation system that implements an embodiment, and the changes in the snapshot will trigger leaf level rule evaluation and the execution of a roll up execution plan. The following examples assume the latter embodiment for convenience. However, other hybrid embodiments may be used.

Figure 5:
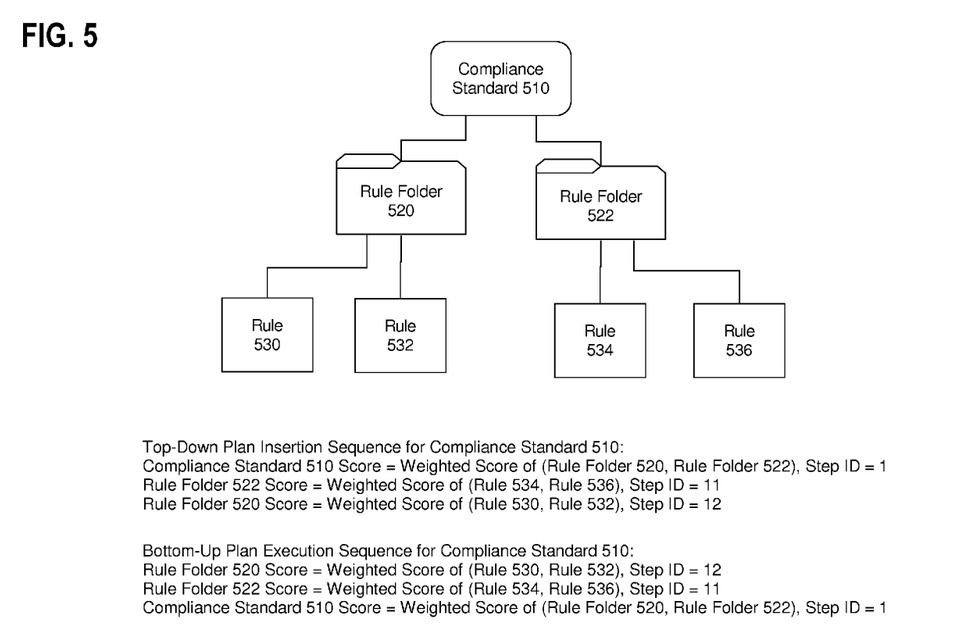
FIG. 5 illustrates an execution plan insertion sequence and execution sequence in an embodiment.

FIG. 5 illustrates an execution plan insertion sequence and execution sequence in an embodiment. The generation of the execution plan for a compliance standard is top-down in an embodiment. The generation of the execution plan for a given compliance standard begins by determining, for the compliance standard node, which child nodes must be considered when determining the score for the compliance standard. A step is generated for root node and each internal node in the compliance standard hierarchy that must be generated, and each step is stored. For example, each step may be stored in a table in a database. In an embodiment, for each step in the roll up plan sequence there is a step id (generated in top down fashion), one output node (corresponding to a root node or internal node) and N input nodes (based on immediate children of the output node). The roll up steps are executed in bottom up fashion (i.e. descending order of the step id). For example, the compliance score for the internal node for rule folder 520 is based on the associated rules (input nodes): rule 530 and rule 532.

Execution Plan Insertion

After identifying all children nodes associated with the example compliance standard 510, the insertion sequence associated with FIG. 5 will be generated as follows:
Compliance Standard 510 Score=Weighted Score of (RF 520, RF 522), Step ID=1
Rule Folder 522 Score=Weighted Score of (Rule 534, Rule 536), Step ID=11
Rule Folder 520 Score=Weighted Score of (Rule 530, Rule 532), Step ID=12

The first insertion in the execution plan is the step associated with compliance standard 510. The input required for determining a compliance score for the compliance standard includes the compliance values associated with rule folder 520 and rule folder 522. The contribution of these rule folders to the overall compliance score for compliance standard 510 may be unequal. For example, 75% of the compliance score may be based on rule folder 522 if the rules in rule folder 522 are deemed to be more critical than the rules in rule folder 520.

The second insertion into the execution plan based on FIG. 5 is the step associated with determining the score associated with rule folder 522. The input required for determining a score for rule folder 522 includes the compliance values associated with rule 534 and rule 536. The rules may each carry a different weight, contributing differently to the score for the rule folder. The third insertion into the execution plan (and final insertion in this example) is the step associated with determining the score associated with rule folder 520. The input required for determining a score for rule folder 520 includes the compliance values associated with rule 530 and rule 532. Plan insertion ends when al leaf nodes (rules or other included compliance standards) have been referenced by the execution plan. Since a compliance standard may be included within another compliance standard, the results of an included compliance standard may be referenced as a leaf node of an execution plan.

The example above illustrates, on a very small scale, the generation of a top-down execution plan insertion sequence for a compliance standard. However, the concepts illustrated in the example may be applied to compliance standards with many thousands of nodes, or more.

In an embodiment, as steps are inserted into the execution plan, step identifiers are associated with each step. In one embodiment, the identifier for each step is based on: 1) the level of the node associated with the step in the compliance standard hierarchy; 2) The parent nodes of the node associated with the step; and 3) the order in which the node is detected by the execution plan building logic with respect to sibling nodes. In the example of FIG. 5, the top-level node is assigned the identifier "1" to denote its top-level status. Each child node, in this embodiment, uses the parent node as a prefix, and then adds a number based on its own status among its sibling nodes. This status may be based on detection order, or any other random process. The order in which sibling nodes are executed with respect to one another is inconsequential in an embodiment.

Other methods of execution plan insertion and keeping track of execution order may be used, so long as the insertion plan may be executed from the bottom-up by determining which nodes are leaf nodes. For example, the identifier mechanism discussed above may be used in conjunction with delimiters that denote the level at which a node resides.

Plan Execution Sequence

Using the execution plan created based on the example of FIG. 5, the execution will be performed in a bottom-up fashion. Execution may be triggered by an event, or may run when updated information is provided to the system. In addition, execution may be performed at a specified frequency. The execution sequence will be performed as follows, starting with the step identifier that identifies the last step to be inserted into the execution plan:
Rule Folder 520 Score=Weighted Score of (Rule 530, Rule 532), Step ID=12
Rule Folder 522 Score=Weighted Score of (Rule 534, Rule 536), Step ID=11
Compliance Standard 510 Score=Weighted Score of (RF 520, RF 522), Step ID=1

Using the step IDs discussed in the previous section, the execution plan is executed in descending order in an embodiment. Thus, the first step, when executed, causes a weighted score of rule 530 and rule 532 to be generated. The second step, when executed, causes a weighted score of rule 534 and rule 536 to be generated. Finally, a weighted score of rule folder 520 and rule folder 522 are used to generate a compliance score for compliance standard 510 in the final step. If compliance standard 510 is an included compliance standard, execution may continue as part of an additional execution plan associated with the parent compliance standard.

Scores for each step of the execution plan may be stored in score tables as the execution plan progresses. Scores may then be associated with individual compliance standards, as well as runtime versions of compliance standards. In an embodiment, if the included compliance standard is of the same target type as a parent compliance standard, then the score for the included compliance standard may be retrieved from the score table associated with the parent compliance standard, which may include the ICS in its execution plan.

Runtime Execution Plan

Each compliance standard/target combination is associated with a separate runtime version of the compliance standard in an embodiment. Each instance of the compliance standard/target combination will be associated with a separate execution plan. For example, an included compliance standard may be associated with a first target twice: first, by inclusion as part of a first compliance standard; and second, by inclusion as part of a second compliance standard. Two instances of the included compliance standard will be created. Each instance is known as a "runtime" version of the compliance standard.

Although the runtime versions of any given compliance standard may be generated at runtime, the runtime versions of a compliance standard may be generated and stored in a database to increase efficiency if the compliance standard is not expected to change. Storing runtime versions for later retrieval also allows the execution plans to be created and stored for later use. Each runtime instance of a compliance standard is associated with a separate execution plan in an embodiment. Each runtime instance of a compliance standard is associated with a set of runtime metadata referred to herein as a customization profile. The customization profile defines the requirements of the particular runtime version of the compliance standard it is associated with.

Figure 6:
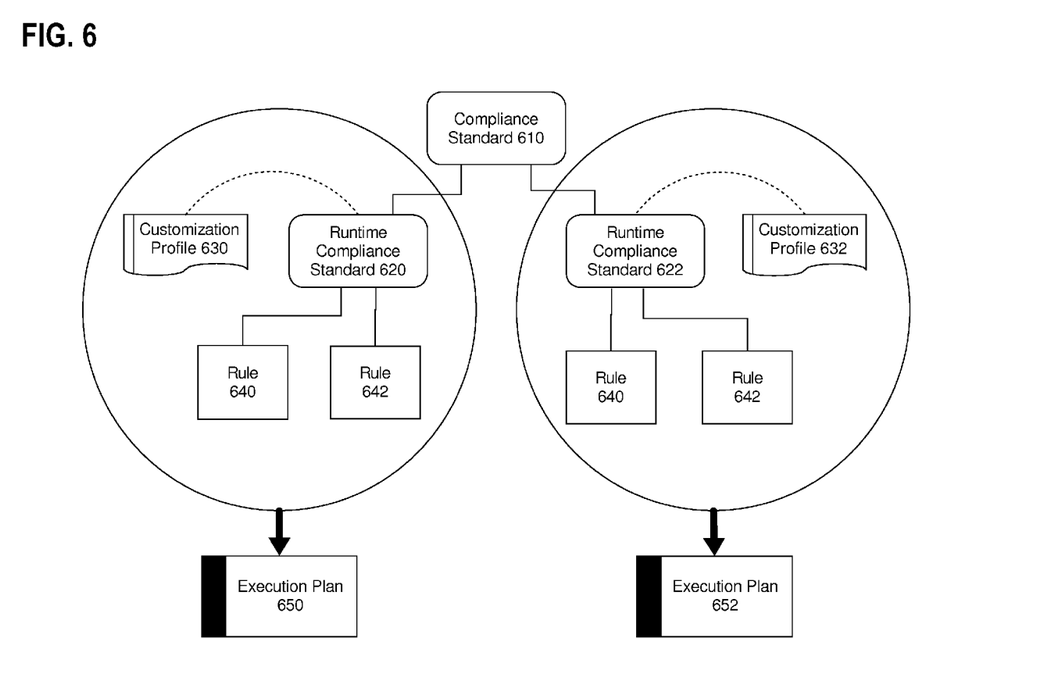
FIG. 6 illustrates the generation of runtime instances of an original compliance standard for an associated target in an embodiment.

FIG. 6 illustrates the generation of runtime instances of an original compliance standard for an associated target in an embodiment. Compliance standard 610 may be an included compliance standard. For example, compliance standard 610 may be included in two separate compliance standards (not shown). A separate runtime compliance standard is created for each inclusion context. Runtime compliance standard 620 is associated with customization profile 630, and runtime compliance standard 622 is associated with customization profile 632. Both of these runtime compliance standards refer to rules 640 and 642, but customization profile 630 may impose different requirements for each rule than customization profile 632.

For example, rule 640 may require that the password be changed at a particular interval. Customization profile 630 may define this interval at 90 days, while customization profile 632 may define this interval as 60 days. In addition, rule 640 may be entitled to more weight than rule 642 according to customization profile 632, while the opposite may be true for customization profile 630. Execution plan 650 is created based on runtime compliance standard 620, and Execution plan 652 is created based on runtime compliance standard 622. Each execution plan considers the customization profile associated with its respective runtime compliance standard.

Optimized Plan Execution

A stored affected nodes list may be used to determine the most efficient way to execute all of the execution plans required for a given compliance standard, or even an entire data center. In an embodiment, the information associated with each target that is inputted into the system is compared with previous data to determine which, if any, nodes in the compliance standard hierarchy are affected by changes described in the target information. Using this information, an affected nodes list may be generated, describing which nodes will require score recalculation, and therefore execution of the execution plan associated with that node. Using the affected nodes list, the system can avoid running execution plans for compliance standards which have scores that have not been affected by the most recent target information. Using the affected nodes list, only the portion of the rollup execution plan that overlaps with the affected nodes list will be executed. In an embodiment, rollup and affected nodes lists are computed cumulatively, in a bottom up fashion, starting with the leaf level nodes which were in the initial affected nodes list.

In an embodiment, the affected nodes list is based on the runtime hierarchy. For example, each separate execution plan associated with a compliance standard may be considered. As discussed above with respect to FIG. 6, rule 640 may require that the password be changed at interval X. Customization profile 630 may define this interval at less than or equal to 90 days, while customization profile 632 may define this interval as 60 days or less. If the evaluation of rule 640 results show that the password for the target associated with the compliance standard 610 has not been changed after 60 days, then the parent node for the instance of rule 640 associated with runtime compliance standard 622 will be placed in the affected nodes list. However, if the interval has yet to reach 90 days, then rule 640 has no effect on its parent for the instance of rule 640 associated with runtime compliance standard 620, and the parent of rule 640 associated with runtime compliance standard 620 will not be placed in the affected nodes list.

The affected nodes list may be built on-the-fly by the plan execution logic that executes the compliance standard execution plan after the changed targets have been identified. If a change is detected with a specific target, and that change will affect the score of the parent node, the execution logic places the parent node in the affected nodes list. However, if the change will not affect the score of the parent node, then the parent will not be placed in the affected nodes list. Thus, only execution plans associated with affected nodes will be executed.

Locking

Tables that store information about compliance standards, compliance scores, hierarchical data, and other information described herein may change over time. If changes are imposed on this information while compliance data is being generated, and rules used to generate the compliance data rely on the changed information, then rules that have not used the updated information would be inconsistent, as they would be based on a different data set. Mechanisms which control access to these resources may be useful in an embodiment to ensure that a compliance standard score being generated is generated based on consistent data.

One such mechanism is referred to as a lock. A lock is a data structure that indicates that a particular process has been granted certain rights with respect to a resource. There are many types of locks. Some types of locks may be shared on the same resource by many processes, while other types of locks prevent any other locks from being granted on the same resource.

In an embodiment, all compliance standards that contain rules that require reevaluation are determined. This determination may be made based on a mapping between input and output nodes, stored in a hierarchical structure in a database. In an embodiment, all execution plans, which were previously stored, are checked to see if they include any of the rules that require reevaluation. All possible combinations for which the score needs to be reevaluated are determined, and then all associated data may be locked before execution begins to ensure execution plan consistency.

Measuring Compliance with one or more Compliance Standards

Figure 7:
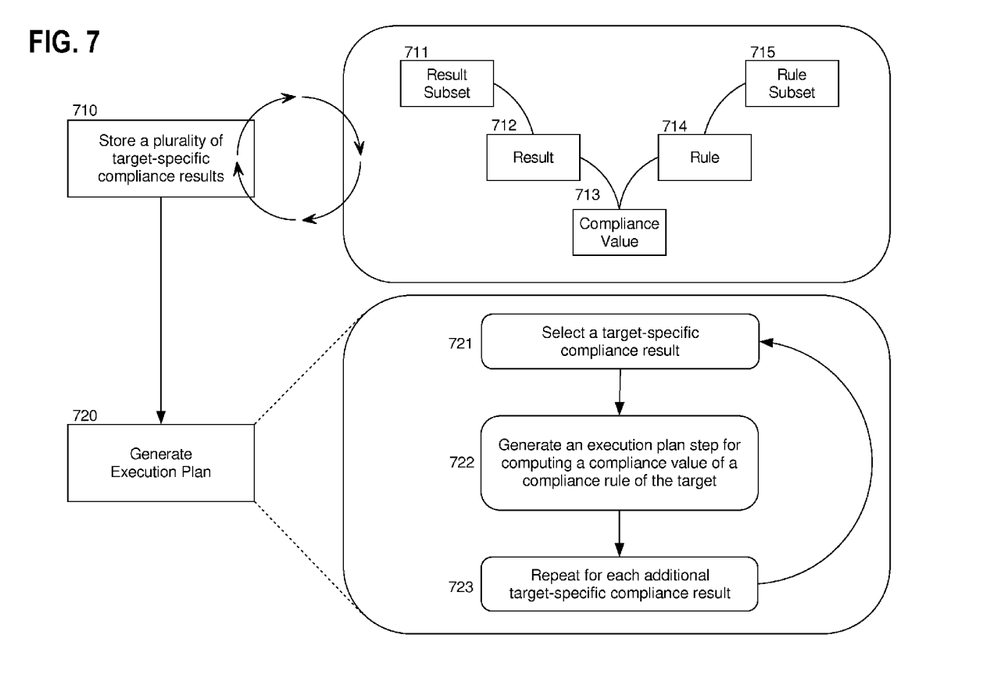
FIG. 7 illustrates a method for measuring compliance with one or more compliance standards in an embodiment.

FIG. 7 illustrates a method for measuring compliance with one or more compliance standards in an embodiment. Compliance with one or more compliance standards is measured. At step 710, compliance-specific target results are stored. The compliance results include, for each target, a result subset 711 of target-specific compliance results for a rule subset 715 of compliance rules. Each target-specific compliance result 712 of the result subset includes a compliance value 713. The compliance value 713 represents compliance to a compliance rule 714 of the rule subset.

At step 720, an rollup execution plan is executed. The rollup execution plan execution generates data that measures compliance to a first compliance standard. At step 721, a target-specific compliance result to be determined is selected. At step 722, for each target-specific compliance result, an execution plan step is executed for computing the compliance value of the respective compliance rule of the respective target. At step 723, steps are repeated for each additional target-specific compliance result for which a value should be computed.

In an embodiment, an execution plan sequence is generated at compliance standard definition compilation time. The execution of the roll up happens (based on rollup plan sequence generated at compliance standard definition/compilation time), when the leaf level rules are evaluated and its results are updated, based on changes in configuration data. At the time of execution of the roll up execution plan, the previously generated execution plan sequence steps are used in conjunction with runtime CS customization metadata for the target. Leaf level rules are evaluated for the target, based on the customization metadata of the rules in context of the runtime CS rule leaf node in the runtime CS hierarchy for the target, and the target configuration data.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
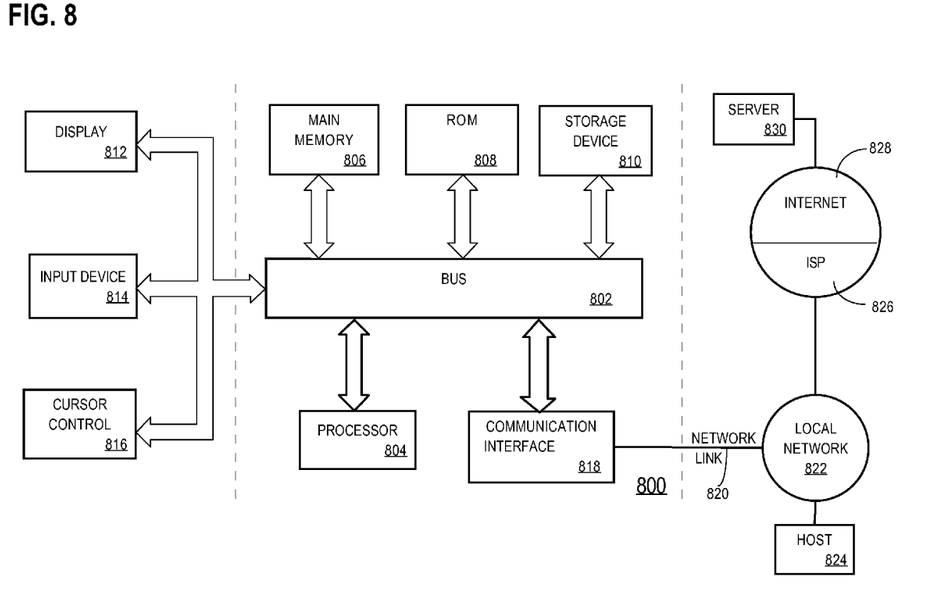
FIG. 8 illustrates a computer system upon which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for measuring compliance with one or more compliance standards, comprising:
   generating and storing execution plan metadata based at least in part on one or more compliance rules of a plurality of compliance rules;
   storing compliance-specific target results, wherein for each target of a plurality of targets, said compliance-specific target results include a result subset of target-specific compliance results for a rule subset of the plurality of compliance rules, each target-specific compliance result of said result subset including a compliance value representing compliance to a respective compliance rule of said rule subset;
   wherein each target of said plurality of targets is a computer resource, and wherein at least one of said plurality of targets is a first composite target that includes two or more member targets;
   based at least in part on the execution plan metadata, generating an execution plan for generating data that measures compliance to a first compliance standard, wherein generating an execution plan includes:
      for each target-specific compliance result of said compliance-specific target results, generating an execution plan step for computing the compliance value of the respective compliance rule of the respective target; and
   wherein the method is performed by one or more computing devices.

2. The method of claim 1, wherein:
   the first compliance standard is associated with a first compliance rule, the first compliance rule associated with a first member target;
   a second compliance standard is associated with a second compliance rule, the second compliance rule associated with the first member target; and
   a contribution of the first compliance rule to the first compliance standard is different than a contribution of the second compliance rule to the second compliance standard.

3. The method of claim 2, wherein:
   the first rule is associated with the first composite target, the first composite target having as a member the first member target; and
   the second rule is associated with a second composite target, the second composite target having as a member the first member target.

4. The method of claim 1, wherein the first composite target comprises a first member target of a first target type and a second member target of a second target type.

5. The method of claim 1, wherein the first compliance standard comprises one or more included compliance standards.

6. The method of claim 1, further comprising:
   in respons e to detecting an event associated with a first target:
      evaluating one or more rules associated with the first target; and
      evaluating one or more compliance standards associated with the first target.

7. The method of claim 6, wherein at least one rule associated with a second target is not evaluated in response to detecting a change with the first target.

8. The method of claim 1, wherein the step of generating an execution plan further comprises determining, based at least in part on a compliance standard hierarchy comprising as nodes compliance standards and rules, a sequence in which the execution plan steps should be evaluated, wherein the sequence begins with one or more rule nodes.

9. The method of claim 8, wherein each particular node of the compliance standard hierarchy is expressed as a string of characters comprising a sequence of node identifiers beginning with an identifier of a parent node and ending with an identifier of the particular node.

10. A computer-readable non-transitory storage medium storing instructions for measuring compliance with one or more compliance standards, which, when executed by one or more processors, cause the one or more processors to perform:
   generating and storing execution plan metadata based at least in part on one or more compliance rules of a plurality of compliance rules;
   storing compliance-specific target results, wherein for each target of a plurality of targets, said compliance-specific target results include a result subset of target-specific compliance results for a rule subset of the plurality of compliance rules, each target-specific compliance result of said result subset including a compliance value representing compliance to a respective compliance rule of said rule subset;
   wherein each target of said plurality of targets is a computer resource, and wherein at least one of said plurality of targets is a first composite target that includes two or more member targets;
   based at least in part on the execution plan metadata, generating an execution plan for generating data that measures compliance to a first compliance standard, wherein generating an execution plan includes:
      for each target-specific compliance result of said compliance-specific target results, generating an execution plan step for computing the compliance value of the respective compliance rule of the respective target.

11. The computer-readable non-transitory storage medium of claim 10, wherein:
   the first compliance standard is associated with a first compliance rule, the first compliance rule associated with a first member target;
   a second compliance standard is associated with a second compliance rule, the second compliance rule associated with the first member target; and
   a contribution of the first compliance rule to the first compliance standard is different than a contribution of the second compliance rule to the second compliance standard.

12. The computer-readable non-transitory storage medium of claim 11, wherein:
   the first rule is associated with the first composite target, the first composite target having as a member the first member target; and
   the second rule is associated with a second composite target, the second composite target having as a member the first member target.

13. The computer-readable non-transitory storage medium of claim 10, wherein the first composite target comprises a first member target of a first target type and a second member target of a second target type.

14. The computer-readable non-transitory storage medium of claim 10, wherein the first compliance standard comprises one or more included compliance standards.

15. The computer-readable non-transitory storage medium of claim 10, wherein the instructions further include instructions for:
   in response to detecting an event associated with a first target:
      evaluating one or more rules associated with the first target; and
      evaluating one or more compliance standards associated with the first target.

16. The computer-readable non-transitory storage medium of claim 15, wherein at least one rule associated with a second target is not evaluated in response to detecting a change with the first target.

17. The computer-readable non-transitory storage medium of claim 10, wherein the step of generating an execution plan further comprises determining, based at least in part on a compliance standard hierarchy comprising as nodes compliance standards and rules, a sequence in which the execution plan steps should be evaluated, wherein the sequence begins with one or more rule nodes.

18. The computer-readable non-transitory storage medium of claim 17, wherein each particular node of the compliance standard hierarchy is expressed as a string of characters comprising a sequence of node identifiers beginning with an identifier of a parent node and ending with an identifier of the particular node.

* * * * *

UNITED STATES PATENT AND TRADEMARK OFFICE
CERTIFICATE OF CORRECTION

PATENT NO. : 8,352,453 B2
APPLICATION NO. : 12/821073
DATED : January 8, 2013
INVENTOR(S) : Raja Chatterjee It is certified that error appears in the above-identified patent and that said Letters Patent is hereby corrected as shown below:

In column 3, line 25, delete "password" and insert -- (password --, therefor.

In column 14, line 55, in Claim 6, delete "respons e" and insert -- response --, therefor.

Signed and Sealed this
Ninth Day of April, 2013

Teresa Stanek Rea
*Acting Director of the United States Patent and Trademark Office*